United States Patent
Ohzaki et al.

(10) Patent No.: US 9,754,088 B2
(45) Date of Patent: Sep. 5, 2017

(54) INFORMATION PROCESSING SYSTEM, ELECTRONIC DEVICE AND SERVICE AUTHORIZATION METHOD

(71) Applicants: Hiroki Ohzaki, Kanagawa (JP); Masato Nakajima, Tokyo (JP); Yasuharu Fukuda, Tokyo (JP); Shigeki Kashiyama, Tokyo (JP)

(72) Inventors: Hiroki Ohzaki, Kanagawa (JP); Masato Nakajima, Tokyo (JP); Yasuharu Fukuda, Tokyo (JP); Shigeki Kashiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 37 days.

(21) Appl. No.: 14/918,772

(22) Filed: Oct. 21, 2015

(65) Prior Publication Data
US 2016/0125173 A1     May 5, 2016

(30) Foreign Application Priority Data
Oct. 30, 2014   (JP) .................................. 2014-221762

(51) Int. Cl.
*G06F 21/10*    (2013.01)
*H04L 29/08*    (2006.01)

(52) U.S. Cl.
CPC ............ *G06F 21/105* (2013.01); *G06F 21/10* (2013.01); *H04L 67/10* (2013.01); *H04L 2463/101* (2013.01)

(58) Field of Classification Search
CPC ............................ G06F 21/10; H04L 2463/101
See application file for complete search history.

(56) References Cited

U.S. PATENT DOCUMENTS

| | | | |
|---|---|---|---|
| 2003/0072448 A1* | 4/2003 | Nakamura | G06F 21/10 380/243 |
| 2005/0038753 A1* | 2/2005 | Yen | G06F 21/10 705/59 |
| 2008/0209569 A1* | 8/2008 | Araki | G06F 21/44 726/26 |
| 2010/0162349 A1* | 6/2010 | Kawai | G06F 21/6218 726/1 |

(Continued)

FOREIGN PATENT DOCUMENTS

| | | |
|---|---|---|
| JP | 2013-029994 | 2/2013 |
| JP | 2014-092823 | 5/2014 |

*Primary Examiner* — James Turchen
(74) *Attorney, Agent, or Firm* — IPUSA, PLLC

(57) ABSTRACT

An information processing system includes an information processing device, and an electronic device to utilize a service provided from the information processing device. A service delivery unit provides the service for the electronic device. An information management unit manages license information of the service, generates use permission information and sends the generated use permission information to the electronic device. An execution management unit manages an execution request of the service specifying the use permission information of the service. An execution unit determines whether to have a use authority of a function of the electronic device utilized by the service based on contents of the license included in the use permission information of the service and executes the service by utilizing the function of the electronic device upon determining that the use authority of the function of the electronic device utilized by the service is present.

8 Claims, 18 Drawing Sheets

(56) References Cited

U.S. PATENT DOCUMENTS

| | | | |
|---|---|---|---|
| 2010/0188712 A1* | 7/2010 | Makishima | H04N 1/0084 358/3.28 |
| 2010/0227681 A1* | 9/2010 | Soemo | A63F 13/12 463/29 |
| 2011/0066721 A1* | 3/2011 | Shinomiya | G06F 21/10 709/224 |
| 2011/0066886 A1* | 3/2011 | Sugiura | G06Q 30/00 714/16 |
| 2011/0157629 A1* | 6/2011 | Fukasawa | H04N 1/00127 358/1.15 |
| 2011/0167499 A1* | 7/2011 | Strom | G06F 21/121 726/27 |
| 2011/0231701 A1* | 9/2011 | Aoki | G03G 15/5079 714/15 |
| 2012/0060031 A1* | 3/2012 | Huang | H04L 9/083 713/168 |
| 2012/0079268 A1* | 3/2012 | Zhong | H04L 63/126 713/156 |
| 2012/0311655 A1* | 12/2012 | Hohlfeld | G06F 21/105 726/1 |
| 2013/0031612 A1* | 1/2013 | Funayama | H04L 63/102 726/4 |
| 2013/0152174 A1* | 6/2013 | Raley | G06F 21/31 726/4 |
| 2013/0324040 A1* | 12/2013 | Iwasaki | H04B 5/00 455/41.1 |
| 2014/0123240 A1 | 5/2014 | Seo et al. | |
| 2014/0211219 A1* | 7/2014 | Yabe | H04N 1/4426 358/1.5 |
| 2015/0025935 A1* | 1/2015 | Hao | G06Q 30/0201 705/7.29 |
| 2015/0046248 A1* | 2/2015 | Ben-Yaacov | G06Q 30/02 705/14.41 |
| 2015/0150038 A1* | 5/2015 | Hao | G06F 21/00 725/31 |
| 2015/0172747 A1* | 6/2015 | Huang | H04N 21/4331 725/100 |
| 2016/0371472 A1* | 12/2016 | Walsh | H04L 63/102 |

\* cited by examiner

FIG.11

```
GET /token?RequestedTime=2014-07-15T14%3A50%3A35.123%2B09%3A00 HTTP/1.1
X-App-Id: appid
X-App-Password: password
Cookie: APISID="AQIC5wM2LY4SfcymWBhLM9otpmi8CzEZNEsLXv1X9bEcaB0.*AAJTSQACMDE.*"
```

| INPUT ITEM | CONTENTS |
|---|---|
| X-App-Id | APPLICATION ID |
| X-App-Password | APPLICATION PASSWORD |
| Cookie | AUTHENTICATION TICKET |
| RequestedTime | REQUEST TIME |

FIG.13

```
{
"plain": "Id=550e8400-e29b-41d4-a716-446655440000&RequestedTime=2014-07-15T05:50:35Z&ExpiryTime=2014-07-15T06:50:35Z&ServiceClass=translate&ContractKind=trial",
"encrypted":
"xxxxxxxxxxxxxxxxxxxxxxxxxxxxxxxxxxxxxxxxxxxxxxxxxxxxxxxxxxxxxxxxxxxxxxxxxxxxxxxxxxxxxxxxxx
xxxxxxxxxxxxx"
}
```

| KEY NAME | CONTENTS |
|---|---|
| plain | AUTHORIZATION INFORMATION |
| encrypted | INFORMATION OBTAINED BY ENCRYPTING plain |

| EACH ITEM OF plain | CONTENTS |
|---|---|
| Id | IDENTIFIER |
| RequestedTime | REQUEST TIME |
| ExpiryTime | EXPIRATION DATE |
| ServiceClass | SERVICE NAME |
| ContractKind | CONTRACT CATEGORY |

FIG.15

```
{
  "plain" : "Id=550e8400-e29b-41d4-a716-446655440000&RequestedTime=2014-07-
15T05:50:35Z&ExpiryTime=2014-07-15T06:50:35Z&Funcs=scan,ocr,mono_print",
  "encrypted":
"xxxxxxxxxxxxxxxxxxxxxxxxxxxxxxxxxxxxxxxxxxxxxxxxxxxxxxxxxxxxxxx
xxxxxxxxxxxx"
}
```

| KEY NAME | CONTENTS |
|---|---|
| plain | AUTHORIZATION INFORMATION |
| encrypted | INFORMATION OBTAINED BY ENCRYPTING plain |

| EACH ITEM OF plain | CONTENTS |
|---|---|
| Id | IDENTIFIER |
| RequestedTime | REQUEST TIME |
| ExpiryTime | EXPIRATION DATE |
| Funcs | AVAILABLE FUNCTION NAME |

FIG.16

| SERVICE NAME | CONTRACT CATEGORY | FUNCTION NAME |
|---|---|---|
| translate | trial | scan, ocr, mono_print |
| translate | paid | scan, mono_print, color_print |
| ocr | trial | scan, ocr, mono_print |
| ocr | paid | scan, ocr |

FIG.17

APPLICATION
SERVICE NAME:translate

| CONTRACT CATEGORY | AVAILABLE FUNCTION |
|---|---|
| trial | scan, ocr, mono_print |
| paid | scan, mono_print, color_print |

FIG.18

```
{
 "plain": "Id=550e8400-e29b-41d4-a716-446655440000&RequestedTime=2014-07-
15T05:50:35Z&ExpiryTime=2014-07-15T06:50:35Z&Role=poweruser",
 "encrypted":
 "xxxxxxxxxxxxxxxxxxxxxxxxxxxxxxxxxxxxxxxxxxxxxxxxxxxxxxxxxxxxxxxxxxxxxxxxxxxx
xxxxxxxxxxx"
}
```

| KEY NAME | CONTENTS |
|---|---|
| plain | AUTHORIZATION INFORMATION |
| encrypted | INFORMATION OBTAINED BY ENCRYPTING plain |

| EACH ITEM OF plain | CONTENTS |
|---|---|
| Id | IDENTIFIER |
| RequestedTime | REQUEST TIME |
| ExpiryTime | EXPIRATION DATE |
| Role | ROLE NAME |

FIG.20

| API | NECESSARY FUNCTION NAME |
|---|---|
| SCAN | scan |
| SCAN + OCR | scan, ocr |
| ⋮ | ⋮ |

INFORMATION PROCESSING SYSTEM, ELECTRONIC DEVICE AND SERVICE AUTHORIZATION METHOD

BACKGROUND OF THE INVENTION

1. Field of the Invention

The present invention relates to an information processing system, an electronic device and a service authorization method.

2. Description of the Related Art

In recent years, a variety of cloud services is provided on the Internet. In the cloud service, an authentication mechanism is often provided for security measures such as operation and maintenance of ID and password, and access control.

For example, as disclosed in Japanese Laid-Open Patent Application Publication No. 2013-29994, users sometimes buy licenses of the cloud services to be utilized and utilize the cloud services. Authentication mechanisms authenticate whether the users have the licenses to utilize the cloud services. In the cloud services, sometimes an access control is performed based on license information managed for each cloud service and whether to authorize the use of cloud service is controlled per service unit.

Services provided from information processing apparatuses on the network for electronic devices include ones that utilize functions of the electronic devices. The functions of the electronic devices sometimes need licenses to be utilized.

Accordingly, sometimes even users, who have licenses to utilize the service provided from the information processing apparatus on the network for the electronic devices, do not have the licenses to utilize the function of the electronic devices.

SUMMARY OF THE INVENTION

Accordingly, embodiments of the present invention may provide an information processing system, an electronic apparatus and a service authorization method reducing one or more of the above-described problems.

More specifically, the embodiments of the present invention may provide an information processing system, an electronic device and a service authorization method that can cause the electronic device to perform a different operation from contents of a license of a function of the electronic device based on contents of a license of a service provided for the electronic device from an information processing apparatus on a network.

According to one embodiment of the present invention, there is provided an information processing system including at least one information processing device, and an electronic device configured to utilize a service provided from the at least one information processing device. A service delivery unit is provided and configured to provide the service for the electronic device. An information management unit is provided and configured to manage license information of the service, to generate use permission information and to send the generated use permission information to the electronic device. An execution management unit is provided and configured to manage an execution request of the service specifying the use permission information of the service. An execution unit is provided and configured to determine whether to have a use authority of a function of the electronic device utilized by the service based on contents of the license included in the use permission information of the service and configured to execute the service by utilizing the function of the electronic device upon determining that the use authority of the function of the electronic device utilized by the service is present.

According to another embodiment of the present invention, there is provided an electronic device configured to utilize a service provided from at least one information processing apparatus. In the electronic device, a request unit is provided and configure to manage license information of a service provided from a service delivery device and to request use permission information of the service from an information management device configured to generate and send the use permission information. An execution management unit is provided and configured to manage an execution request of the service specifying the use permission information of the service. An execution unit is provided and configured to determine whether to have a use authority of a function of the electronic device utilized by the service based on contents of a license included in the use permission information of the service and configured to execute the service by utilizing the function of the electronic device upon determining that the use authority of the function of the electronic device utilized by the service is present.

According to another embodiment of the present invention, there is provided a service authorization method executed by an information processing system including at least one information processing device and an electronic device configured to utilize a service provided from the at least one information processing device. In the method, use permission information is generated based on a request from the electronic device configured to manage license information of the service provided from the information processing device based on a request from the electronic device having the license of the service. The generated use permission information of the service is sent to the electronic device. The execution request of the service specifying the use permission information of the service is managed in the electronic device. It is determined whether to have a use authority of a function of the electronic device utilized by the service based on contents of the license included in the use permission information. The service is executed upon determining that the use authority of the function of the electronic device utilized by the service is present.

Other objects, features and advantages of the present invention will become more apparent from the following detailed description when read in conjunction with the accompanying drawings.

BRIEF DESCRIPTION OF THE DRAWINGS

FIG. 11 is an explanation drawing of an example of contents contained in an authorized token acquisition request;

FIG. 13 is a configuration diagram illustrating an example of the authorized token;

FIG. 15 is a configuration diagram illustrating another example of the authorized token;

FIG. 16 is a configuration diagram illustrating an example of a correspondence table between a service license and a function utilized by the ID management service unit for generating the authorized token;

FIG. 17 is a schematic view illustrating an example of an application form;

FIG. 18 is a configuration diagram illustrating another example of the authorized token;

FIG. 20 is a diagram illustrating an example of a correspondence table between the APIs and necessary function names.

DETAILED DESCRIPTION OF THE PREFERRED EMBODIMENTS

A description is given, with reference to the accompanying drawings, of embodiments of the present invention.

First Embodiment

<System Configuration>

Figure 1:
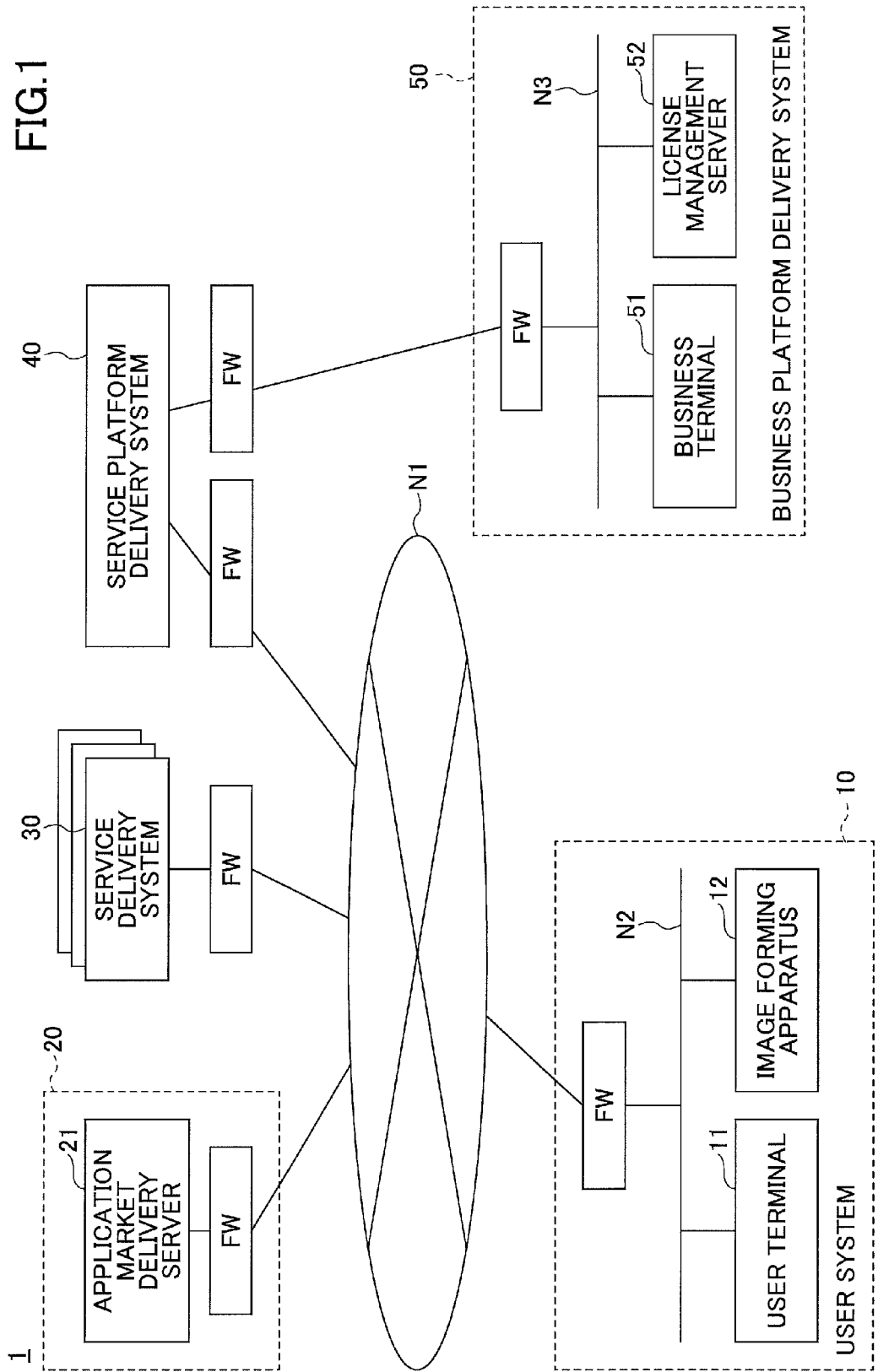
FIG. 1 is a configuration diagram illustrating an example of an information processing system according to a first embodiment of the present invention.

FIG. 1 is a configuration diagram illustrating an example of an information processing system according to a first embodiment of the present invention. An image forming apparatus 1 in FIG. 1 includes a user system 10, an application market delivery system 20, a service delivery system 30, a service platform delivery system 40, and a business platform delivery system 50.

The user system 10, the application market delivery system 20, the service delivery system 30 and the service platform delivery system 40 are connected to each other through a network N1 such as the Internet. The service platform delivery system 40 and the business platform delivery system 50 are connected to each other through a dedicated line.

A network N2 of the user system 10 is a private network provided inside a firewall FW. The firewall FW detects and blocks an unauthorized access. A user terminal 11 and an image forming apparatus 12 such as a multifunction peripheral are connected to the network N2. Here, the image forming apparatus 12 is an example of an electronic device a service of which a user tests or utilizes.

The user terminal 11 can be implemented by an information processing apparatus in which a general operating system is installed. The user terminal 11 includes a wireless communication unit or a wired communication unit. The user terminal 11 is a terminal that a user can operate such as a smart phone, a cell phone, a tablet terminal, and a PC (Personal Computer).

The image forming apparatus 12 is an apparatus that has an image forming function such as a multifunction peripheral. The image forming apparatus 12 is an apparatus that performs a process related to an image formation such as a multifunction peripheral, a copier, a scanner, a printer, a laser printer, a projector, and an electronic blackboard in each of which a browser has been installed. In FIG. 1, although an example of including the single user terminal 11 and the single image forming apparatus 12 is illustrated, a plurality of user terminals 11 and image forming apparatuses 12 may be provided.

An application market delivery server 21 of the application market delivery system 20 is connected to the network N1 through the firewall FW. The application market delivery server 21 can be implemented by at least one information processing apparatus that installs a general OS (Operating System) and the like therein.

The application market delivery system 20 may be provided for each sales area, company or the like. The application delivery server 21 provides an application market screen such as a service list screen and an application screen for the user terminal 11 and the image forming apparatus 12.

The service delivery system 30 is connected to the network N1 through the firewall FW. The service delivery system 30 provides a variety services for the user terminal 11 and the image forming apparatus 12. The service delivery system 30 can be implemented by at least one information processing apparatus that has installed a general OS and the like. A service provided from the service delivery system 30 may be a service provided from an external service provider and the like in addition to a service provided from an operator of the service platform delivery system 40.

The service platform delivery system 40 is connected to the network N1 through the firewall FW. The service platform delivery system 40 can be implemented by at least one information processing apparatus that has installed a general OS and the like.

The service platform delivery system 40 has a function such as authentication/authorization, tenant/user management, license management, and account registration. The service platform delivery system 40 receives the account registration and a login request from the user terminal 11 and the image forming apparatus 12. Moreover, the service platform delivery system 40 receives an acknowledgement request of an authentication ticket and an acquisition request of user information from the service delivery system 30.

A network N3 of the business platform delivery system 50 is a private network provided inside a firewall. A business terminal 51 and a license management server 52 are connected to the network N3. The business terminal 51 and the license server 52 can be implemented by at least one information processing apparatus that has installed a general OS and the like.

The business terminal 51 includes a wireless or wired communication unit. The business terminal 51 is a terminal that a person in charge of the business can operate such as a smartphone, a mobile phone, a tablet terminal, and a PC. The person who is in charge of the business can request an issue of a license from the license management server 52 through the business terminal 51.

The license management server 52 has a function such as license management. The license management server 52 receives a request such as an issue of license and the like from the service platform delivery and the business terminal 51. A configuration of the information processing system 1 in FIG. 1 is an example, and another configuration is possible.

<Hardware Configuration>

Figure 2:
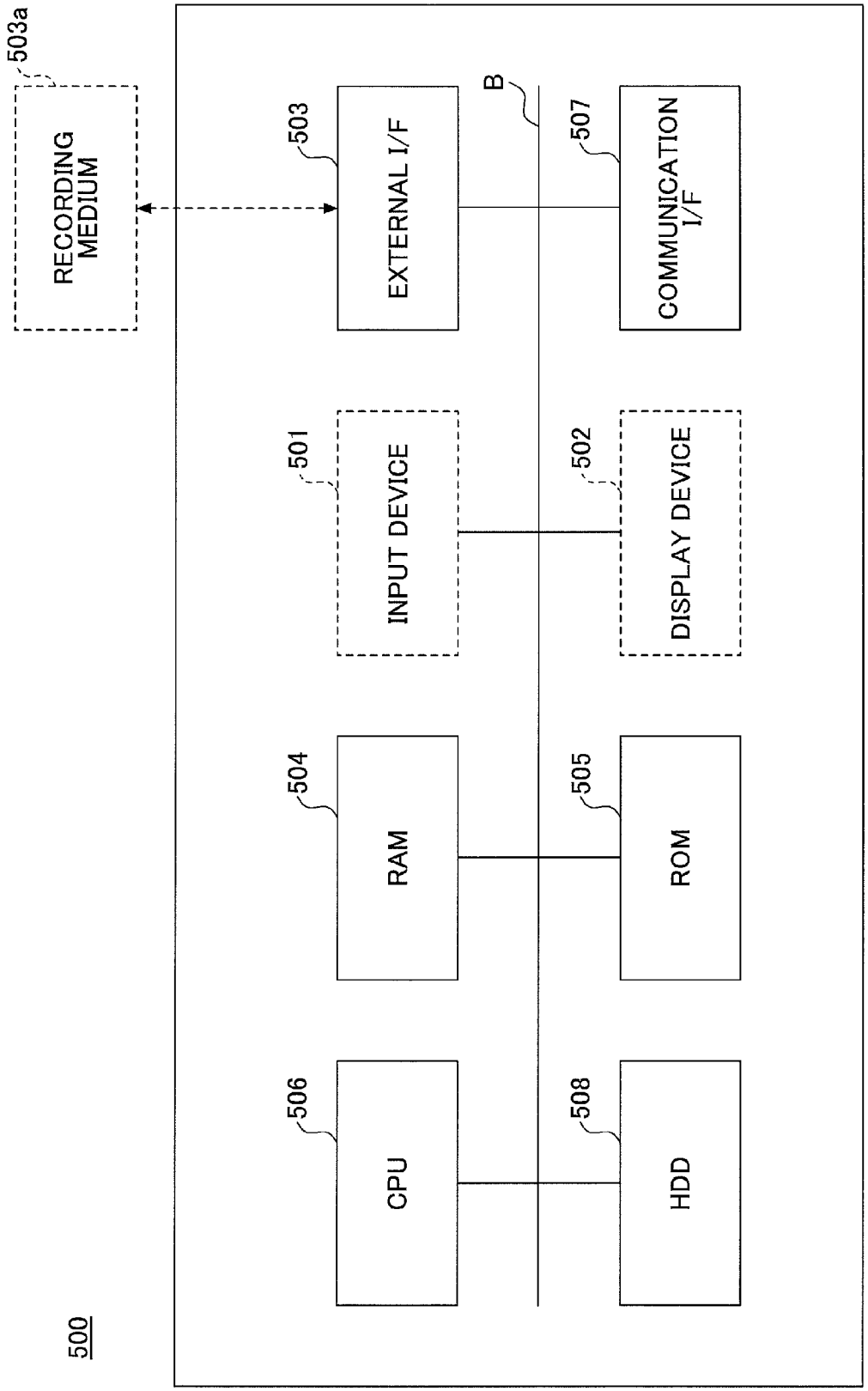
FIG. 2 is a hardware configuration diagram illustrating an example of a computer according to an embodiment of the present invention.

The user terminal 11, the application market delivery server 21, the business terminal 51 and the license management server 52 are, for example, implemented by a computer having a hardware configuration as illustrated in FIG. 2. Also, an information processing apparatus that implements the service delivery system 30 and the service platform delivery system 40 is implemented by the computer having the hardware configuration as illustrated in FIG. 2. FIG. 2 is a hardware configuration diagram of an example of a computer according to the present embodiment.

A computer 500 illustrated in FIG. 2 includes an input device 501, a display device 502, an external I/F 503, a RAM (Random Access Memory) 504, a ROM (Read Only Memory) 505, a CPU (Central Processing Unit) 506, a communication I/F 507, an HDD (Hard Disk Drive) 508 and the like, each of which is connected to each other through a bus B. The input device 501 and the display device 502 may be connected to the bus B only when necessary.

The input device 501 includes a keyboard, a mouse and the like, and is used to allow a user to input each operation signal thereto. The display device 502 includes a display and the like, and displays a process result performed by the computer 500.

The communication I/F 507 is an interface to connect the computer to the networks N1, N2 and N3. This allows the computer 500 to perform data communication through the communication I/F 507.

The HDD 508 is a non-volatile memory device storing a program and data. The stored program and data are, for example, an OS that is basic software controlling the whole computer 500, application software that provides a variety of functions on the OS and the like.

The external I/F 503 is an interface between the computer 500 and an external device. The external device includes, for example, a recording medium 503a. This enables the computer 500 to read and/or to write in the recording medium 503a through the external I/F 503. The recording medium 503a includes, for example, a flexible disk, a CD (Compact Disk), a DVD (Digital Versatile Disk), an SD memory card, a USB (Universal Serial Bus) memory and the like.

The ROM 505 is a non-volatile semiconductor memory (memory device) that can retain a program and data even if the power is turned off. The ROM 505 stores a program and data such as BIOS (Basic Input/Output System) to be executed when the computer 500 starts, an OS setting, and a network setting. The RAM 504 is a volatile semiconductor memory that temporarily holds a program and data.

The CPU 506 is an arithmetic device that implements the entire control and functions of the computer 500 by reading a program and data from the memory device such as the ROM 505 and the HDD 508 on the RAM 504.

The user terminal 11, the application market delivery server 21, the business terminal 51 and the license management server 52 of the present embodiment can implement a variety of processes described later by the hardware configuration of the above-mentioned computer 500. Furthermore, the information processing apparatus that implements the service delivery system 30 and the service platform delivery system 40 of the present embodiment can implement a variety of processes described later by the hardware configuration of the above-mentioned computer 500.

Figure 3:
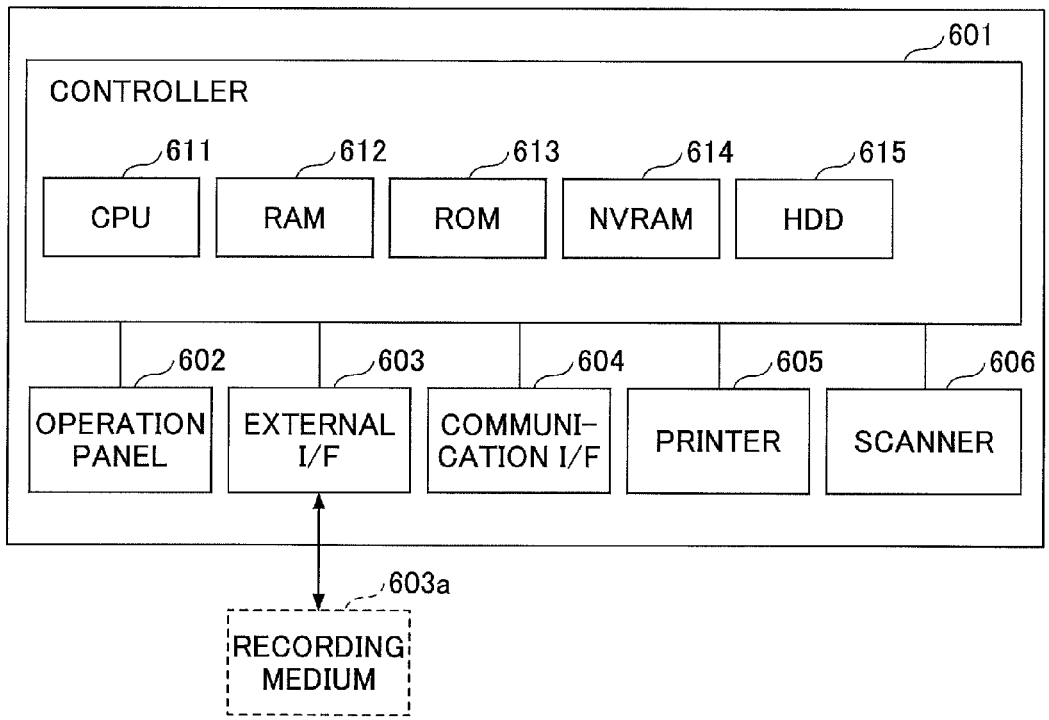
FIG. 3 is a hardware configuration diagram illustrating an example of an image forming apparatus according to an embodiment of the present invention.

For example, the image forming apparatus 12 in FIG. 1 can be implemented by a computer having a hardware configuration as illustrated in FIG. 3. FIG. 3 is a hardware configuration diagram illustrating an example of the image forming apparatus of the present embodiment. The image forming apparatus 12 illustrated in FIG. 3 includes a controller 601, an operation panel 602, an external I/F 603, a communication I/F 604, a printer 605, a scanner 606 and the like.

The controller 601 includes a CPU 611, a RAM 612, a ROM 613, a NVRAM 614 and an HDD 615. The ROM 613 stores a variety of programs and data. The RAM 612 temporarily holds a program and data. The NVRAM 614, for example, stores setting information and the like. The HDD 615 stores a variety of programs and data.

The CPU 611 implements the entire control and functions of the image forming apparatus 12 by reading a program, data, setting information and the like from the ROM 613, the NVRAM 614, the HDD 615 and the like on the RAM 612 and by executing a process.

The operation panel 602 includes an input unit that receives an input from a user and a display unit that performs display. The operation panel 602 may be implemented, for example, by the configuration illustrated in FIG. 2 such as a tablet terminal. In this case, the operation panel 602 installs an OS independent of the OS of the controller 601 therein. The operation panel 602 that installs the OS independent of the OS of the controller 601 can be separated from the image forming apparatus 12, and can be used by wireless connection while being kept separate from the image forming apparatus 12.

The external I/F 603 is an interface between the computer and an external device. The external device includes, for example, a recording medium 603a and the like. This enables an output device 14 to read and/or to write in the recording medium 603a through the external I/F 603. The recording medium 603a includes, for example, a flexible disk, a CD, a DVD, an SD memory card, a USB memory and the like.

The communication I/F 604 is an interface that allows the image forming apparatus 12 to be connected to the network N2. This enables the image forming apparatus 12 to perform data communication through the communication I/F 604. The printer 605 is a printing device that prints print data on a sheet of paper. The scanner 606 is a reading device that reads image data (electronic data) from a manuscript. Here, a description of a hardware configuration of the firewall FW illustrated in FIG. 1 is omitted.

<Software Configuration>
<<Service Delivery System>>

Figure 4:
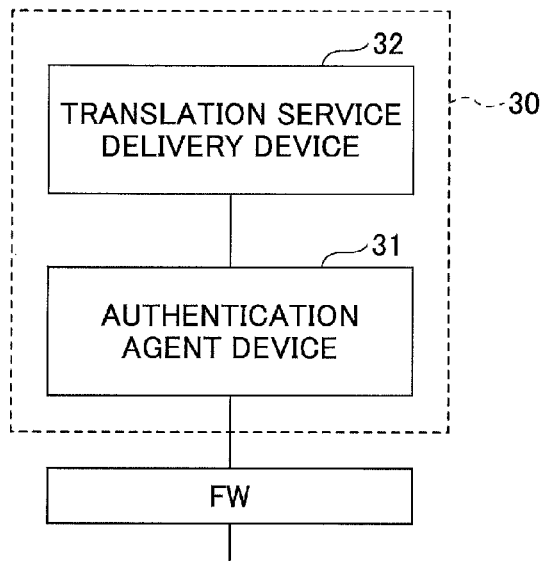
FIG. 4 is a configuration diagram illustrating an example of a service delivery system according to the first embodiment of the present invention.

The service delivery system 30 according to the first embodiment can be implemented by a configuration, for example, as illustrated in FIG. 4. FIG. 4 is a configuration diagram of an example of the service delivery system 30 according to the first embodiment. The service delivery system 30 in FIG. 4 is configured to include an authentication agent device 31 and a translation service delivery device 32. The translation service delivery device 32 is an example of the service delivery device.

The authentication agent device 31 receives a variety of requests for the translation service delivery device 32 from the user terminal 11 and the image forming apparatus 12. The authentication agent device 31 sends the translation service delivery device 32 a request from the user terminal 11 and the image forming apparatus 12 containing a valid authentication ticket issued from the service platform delivery system 40.

Moreover, the authentication agent device 31 redirects the request from the user terminal 11 and the image forming apparatus 12 that does not contain the valid authentication ticket to the service platform delivery system 40. Thus, the authentication agent device 31 sends the request from the user terminal 11 and the imager forming apparatus 12 to the translation service delivery device 32 after causing the user terminal 11 and the imager forming apparatus 12 to obtain the valid authentication ticket.

The translation service delivery device 32 provides a translation service in response to the request from the user terminal 11 and the image forming apparatus 12. Furthermore, the translation service delivery device 32 sends an inquiry to the service platform delivery system 40 about the validity of the authentication ticket and requests information needed to provide the service. The translation service provided from the translation service delivery device 32 is an example of the service.

The image forming apparatus 12 can utilize the translation service by optically recognizing a character of image data scanned from a manuscript and then sending the image data to the translation service delivery device 32. A user may view a translation result from the user terminal 11 by accessing the translation service delivery device 32, or may receive the translation result by email.

<<Service Platform Delivery System>>

Figure 5:
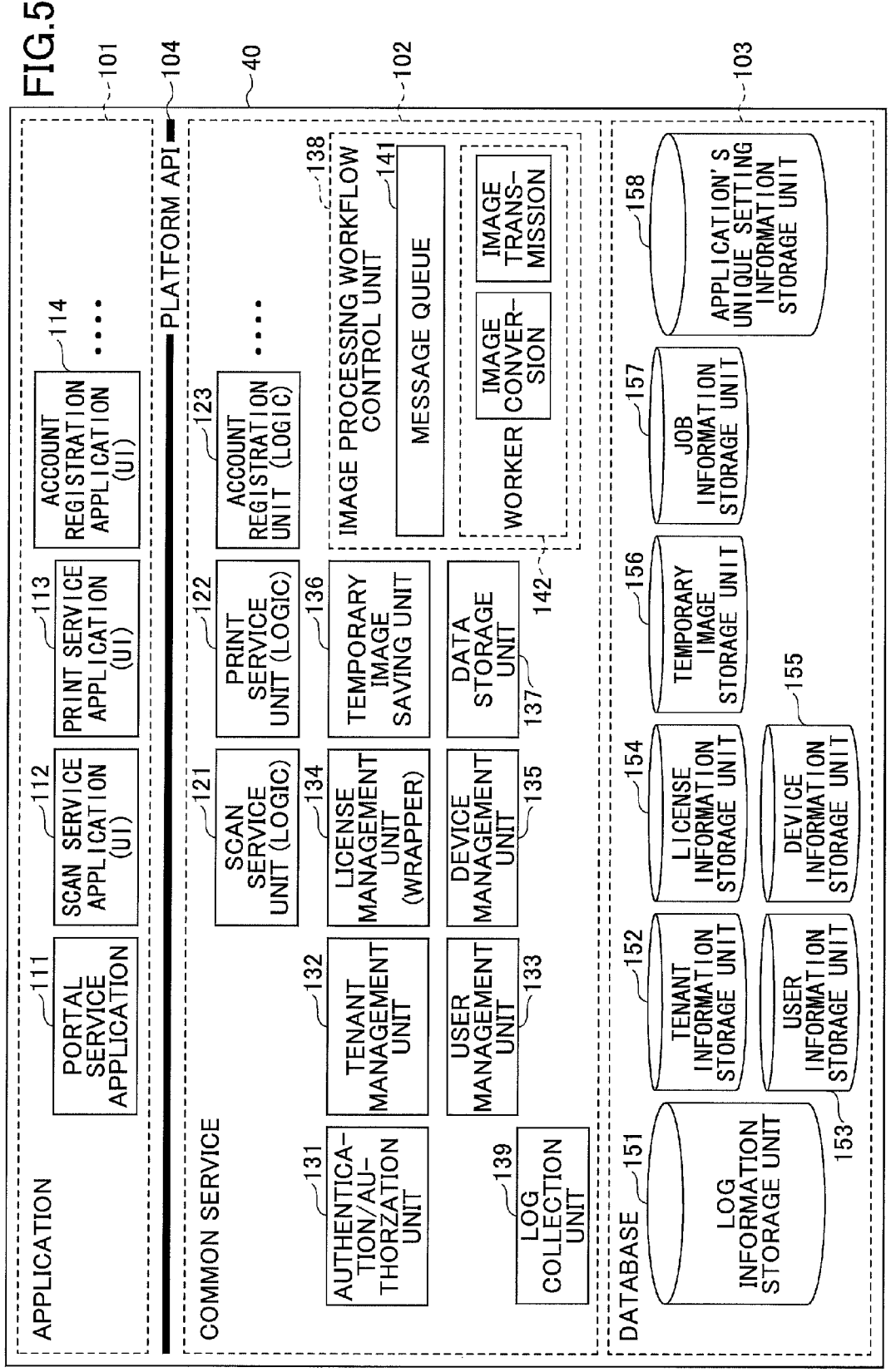
FIG. 5 is a processing block diagram illustrating an example of a service platform delivery system according to the first embodiment of the present invention.

The service platform delivery system 40 according to the first embodiment is implemented by, for example, a process block illustrated in FIG. 5. FIG. 5 is a process block diagram illustrating an example of the service platform delivery system 40 of the first embodiment. The service platform delivery system 40 implements the process block as illustrated in FIG. 5 by running a program.

The service platform delivery system 40 in FIG. 5 implements an application 101, a common service 102, a data base (DB) 103, and a platform API 104.

The application 101 includes a portal service application 111, a scan service application 112, a print service application 113, and an account registration application 114 as an example.

The portal service application 111 is an application that provides a portal service. The portal service provides a service that becomes an entrance to utilize the information processing system 1. The scan service application 112 is a UI (User Interface) of an application that provides a scan service.

The print service application 113 is a UI of an application that provides a print service. The account registration application 114 is a UI of an application that provides an account registration service. Here, the application 101 may contain another service application.

Each UI of the scan service application 112, the print service application 113 and the account registration application 114 may contain Native application displayed or implemented by the user terminal 11 and/or the image forming apparatus 12, and HTML/JavaScript (Trademark) data. The Native application contrasts with a Web application, and is a type of application that causes the user terminal 11 and the image forming apparatus 12 to execute a main process. The Web application is a type of application that causes the service platform delivery system 40 to execute the main process.

The platform API (Application Programming Interface) 104 is an interface to allow the application 101 such as the portal service application 111 to utilize the common service 102.

The platform API 104 is a preliminarily defined interface provided to cause the common service 102 to receive a request from the application 101. The platform API 104 is, for example, constituted of a function, a class and the like. The platform API 104 can be implemented by, for example, a Web API available through a network when the service platform delivery system 40 is constituted of a plurality of information processing apparatuses.

The common service 102 includes a scan service unit 121, a print service unit 122, an account registration unit 123, an authentication/authorization unit 131, a tenant management unit 132, a user management unit 133, a license management unit 134, a device management unit 135, a temporary image saving unit 136, a data storage unit 137, an image processing workflow control unit 138, and a log collection unit 139. In addition, the image processing workflow control unit 138 includes a massage queue 141, and at least worker 142. The worker 142 implements a function of image conversion, image transmission and the like.

The scan service unit 121 functions as a logic unit (API) of the scan service application 112. The print service unit 122 functions as a logic unit (API) of the print service application 113. Also, the account registration unit 123 functions as a logic unit (API) of the account registration application 114.

The authentication/authorization unit 131 executes the authentication and the authorization based on a login request from an office device such as the user terminal 11 and the image forming apparatus 12. The office device is a generic term of the user terminal 11, the image forming apparatus 12 and the like.

The authentication/authorization unit 131 authenticates and authorizes a user by accessing, for example, a user information storage unit 153, a license information storage unit 154 and the like described later. Moreover, the authentication/authorization unit 131 performs client authentication for the image forming apparatus 12 and the like by accessing, for example, a tenant information storage unit 152, a license information storage unit 154, a device information storage unit 155 and the like.

The tenant management unit 132 manages tenant information stored in the tenant information storage unit 152. The user management unit 133 manages user information stored in the user information storage unit 153.

The license management unit 134 manages license information stored in the license information storage unit 154. The device management unit 135 manages device information stored in the device information storage unit 155. The temporary image saving unit 136 saves a temporary image in a temporary image storage unit 156, and obtains the temporary image from the temporary image storage unit 156. The data storage unit 137 stores data in a job information storage unit 157 and the like.

The image processing workflow unit 138 controls a workflow relating to an image process based on a request from the application 101. The massage queue 141 has queues corresponding to types of processes. The image processing workflow control unit 138 puts a massage of a request related to a process (job) in a queue corresponding to a type of the job.

The worker 142 monitors the corresponding queue. When the massage is put in the queue, the worker 142 performs a process depending on the type of the corresponding job such as image conversion and image transmission. The worker 142 may voluntarily read out the massage put in the queue (Pull), or the massage may be provided from the queue for the worker 142 (Push). The log collection unit 139 stores collected log information, for example, in a log information storage unit 151 described later.

The database 103 includes the log information storage unit 151, the tenant information storage unit 152, the user information storage unit 153, the license information storage unit 154, the device information storage unit 155, the temporary image storage unit 156, the job information storage unit 157, and an application's unique setting information storage unit 158.

The log information storage unit 151 stores log information. The tenant information storage unit 152 stores tenant information. The user information storage unit 153 stores user information. The user information includes a user ID and a tenant ID that are associated with each other.

The tenant ID is information to specify a group (organization) such as a company or a department. The tenant ID is not limited to the literal sense of "tenant", but may be, for example, information to identify a contract. Here, the tenant ID is unique.

The license information storage unit 154 stores license information. The license information is associated with the tenant ID and a service name. The device information storage unit 155 stores device information. The temporary image storage unit 156 stores a temporary image. The temporary image is, for example, a file or data of a scanned image processed by the worker 142.

The job information storage unit 157 stores information (job information) of a request related to a process (job). The application's unique setting information storage unit 158 stores setting information peculiar to the application 101.

The service platform delivery system 40 functions as an integrated base that provides a common service such as a workflow related to the authentication/authorization and the image process, and as a service group that provides an application service such as a scan service and a print service by utilizing the function of the integrated base.

The integrated base is, for example, constituted of the common service 102, the data base 103 and the platform API 104. The service group is, for example, constituted of the application 101. Thus, the service platform delivery system 40 illustrated in FIG. 5 is configured to have the service group separated from the integrated base.

Because the service platform delivery system 40 is configured to have the service group separated from the integrated base, the application 101 that utilizes the platform API 104 can be readily developed. Moreover, the service platform delivery service 40 illustrated in FIG. 5 can readily develop a service delivery device such as the translation service delivery device 32 utilizing the platform API 104.

Here, a classification form of the process blocks of the service platform delivery system 40 illustrated in FIG. 5 is an example, and classifying the application 101, the common service 102 and the data base 103 according to a hierarchy illustrated in FIG. 5 is not required. For example, as long as the process of the service platform delivery system 40 according to the first embodiment can be performed, the hierarchy relationship illustrated in FIG. 5 is not limited to a specific form.

<<Image Forming Apparatus>>

Figure 6:
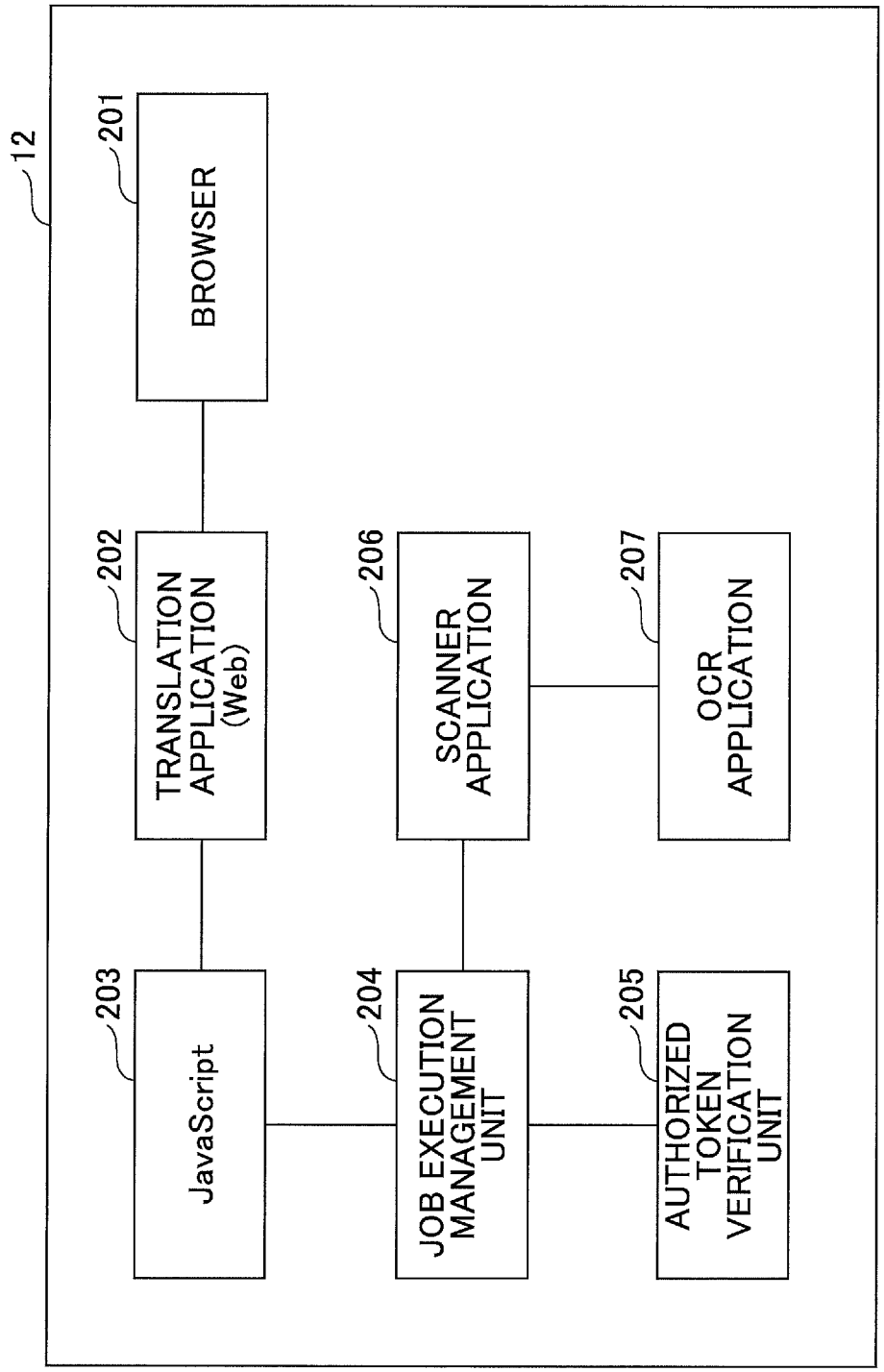
FIG. 6 is a processing block diagram illustrating an example of an image forming apparatus according to the first embodiment of the present invention.

The image forming apparatus 12 of the first embodiment is implemented, for example, by processing blocks illustrated in FIG. 6. FIG. 6 is a processing block diagram illustrating an example of the image forming apparatus 12 according to the first embodiment. The image forming apparatus 12 implements the processing blocks as illustrated in FIG. 6 by running a program. Here, processing blocks used for explaining the embodiment are omitted in the processing block diagram of FIG. 6.

The image forming apparatus 12 in FIG. 6 implements a browser 201, a translation application 202, a JavaScript 203, a job execution management 204, an authorized token verification unit 205, a scanner application 206 and an OCR application 207.

The browser 201 is, for example, a Web browser and displays a screen. In addition, the browser 201 receives a request from a user. The browser 201 causes the translation application 202 and the JavaScript 203 to operate. The translation application 202 and the JavaScript 203 controls a process needed to provide a translation service.

The job execution management unit 204 receives a job execution request with an authorized token from the JavaScript 203. The authorized token verification unit 205 returns a verification result of having verified validity of the authorized token to the job execution management unit 204. The job execution management unit 204 makes a job execution request to the scanner application 206 upon determining that the authorized token is valid.

The scanner application 206 determines whether to have an authority needed to process the job execution request, and executes the job depending on the job execution request upon determining that the scanner application 206 has the authority to execute the job execution request. The scanner application 206 causes the OCR application 207 to perform the process upon determining that the process by the OCR application 207 is needed to execute the job.

<Details of Process>

A description is given below of a processing procedure when utilizing a translation service through the image forming apparatus 12 of the information processing system 1 according to the first embodiment.

<<Overall Sequence>>

Figure 7:
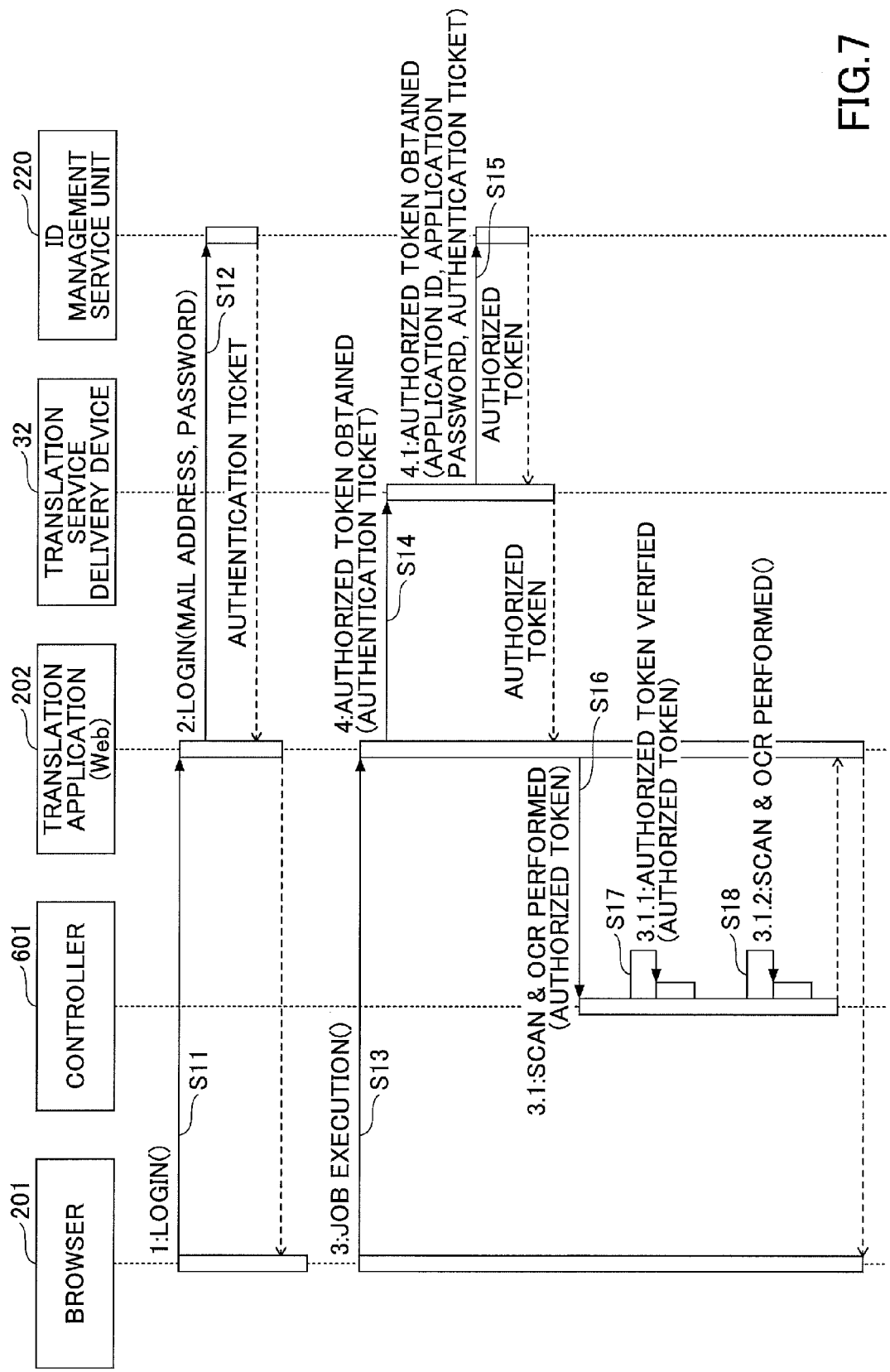
FIG. 7 is a sequence diagram illustrating an example of a processing procedure of utilizing a translation service in an information processing system according to the first embodiment.

FIG. 7 is a sequence diagram illustrating an example of a processing procedure for utilizing a translation service in the information processing system according to the first embodiment. A user who operates the image forming apparatus 12 requests the browser 201 to display the translation application 202 by operating the browser 201.

The browser 201 displays a login screen to allow a user to input necessary information to login on the operation panel 602, and receives an input of a mail address and a password from the user as an example of the necessary information to login.

In step S11, the browser 201 receives the input of the mail address and the password from the user, and then requests the translation application 202 to login when, for example, a login button or the like is pressed down by the user.

In step S12, the translation application 202 requests the ID management service unit 220 of the service platform delivery system 40 to login by specifying the mail address and the password. Here, the ID management service unit 220 corresponds to the authentication/authorization unit 131, the user management unit 133 and the license management unit 134 of the service platform delivery system 40. The ID management service unit 220 authenticates the user by using the mail address and the password specified in step S12.

Upon succeeding in authenticating the user, the ID management service unit 220 issues an authentication ticket and notifies the browser 201 and the translation application 202 in the image forming apparatus 12 of the authentication ticket. The browser 201 displays a screen of the translation application 202.

The user operating the image forming apparatus 12 requests to execute a job utilizing the translation application 202 by operating the browser 201. In step S13, the browser 201 requests the translation application 202 to execute the job.

Here, it is assumed that functions of the scanner application 206 and the OCR application 207 of the image forming apparatus 12 are needed to be utilized to execute the job of the translation application 202. Moreover, it is assumed that an authorized token issued from the ID management service unit 220 is needed to utilize the functions of the scanner application 206 and the OCR application 207.

In step S14, the translation application 202 requests the translation service delivery device 32 to obtain the authorized token by specifying the authentication ticket. In step S15, the translation service delivery device 32 requests the ID management service unit 220 to obtain the authorized token by specifying the authentication ticket, and an application ID and an application password of the translation service.

The ID management service unit 220 issues the authorized token by utilizing the authentication ticket, and the application ID and application password of the translation service. The ID management service unit 220 notifies the translation application 202 in the image forming apparatus 12 of the authorized token by way of the translation service delivery device 32.

In step S16, the translation application 202 requests the controller 601 that executes the scanner application 206 and the OCR application 207 to perform a scanning process and an OCR (optical character recognition) process by specifying the authorized token. In step S17, the controller 601 verifies the authorized token, and determines whether to have an authority to utilize the functions of the scanner application 206 and the OCR application 207.

Upon determining that the authorized token has the authority to utilize the functions of the scanner application 206 and the OCR application 207, the controller 601 performs the scanning process and the OCR process in step S18. The translation application 202 reflects an execution result of the scanning process and the OCR process by the controller 601 on the screen displayed by the browser 201.

Here, a variety of configurations are conceivable with respect to the authorized token of the present embodiment as described later. The verification of the authorized token in step S17 varies depending on the configuration of the authorized token as described later.

<<Platform API Calling Relationship>>

Figure 8:
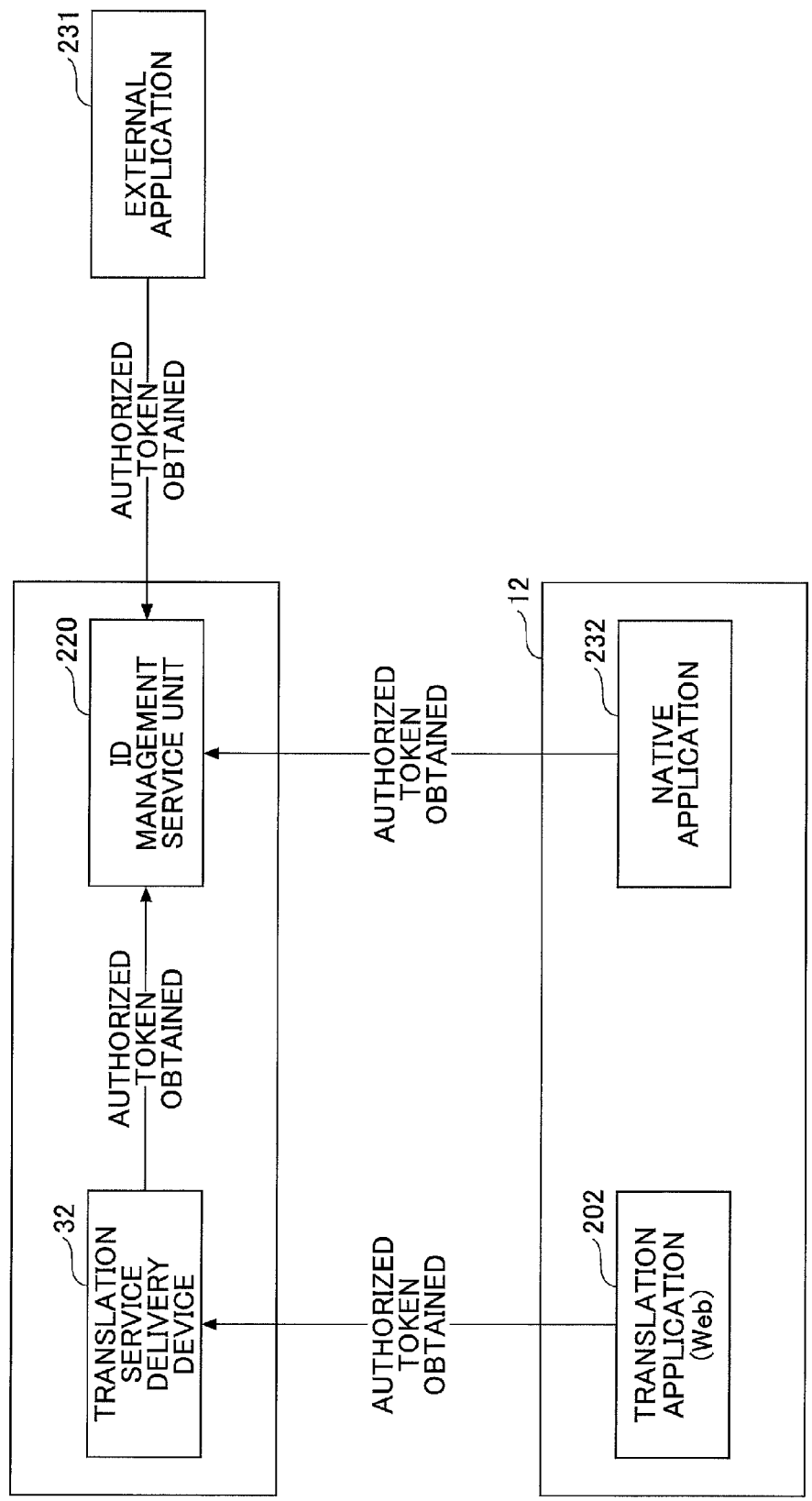
FIG. 8 is a diagram explaining an example of a call relationship of a platform API from the image forming apparatus.

FIG. 8 is a diagram of an example for explaining a calling relationship of the platform API 104 between the image forming apparatus 12. The translation application 202 of the image forming apparatus 12 requests the ID management service unit 220 to obtain the authorized token by way of the translation service delivery device 32. In the meanwhile, an external application 231 or a Native application 232 of the image forming apparatus 12 requests the ID management service unit 220 to obtain the authorized token.

The Native application 232 contrasts with a Web application, and is a type of application that causes the image forming apparatus 12 to perform a main process. The Web application is a type of application that causes the service delivery system 30 or the service platform delivery system 40 to perform the main process.

As illustrated in FIG. 8, the translation application 202 that operates on the browser 201 does not directly utilize an authorized token acquisition API but utilizes the authorized token acquisition API by way of the translation service delivery device 32. This is because authentication information for application authentication (application ID, application password) is more likely to leak when the translation application 202 implemented by HTML, JavaScript 203, CSS (Cascading Style Sheets) and the like has the authentication information for application authentication. In contrast, because the Native application 232 can retain the authentication information for application authentication in secret, the Native application 232 is allowed to directly utilize the authorized token acquisition API.

<<Details of Process of Image Forming Apparatus During Job Execution>>

Figure 9:
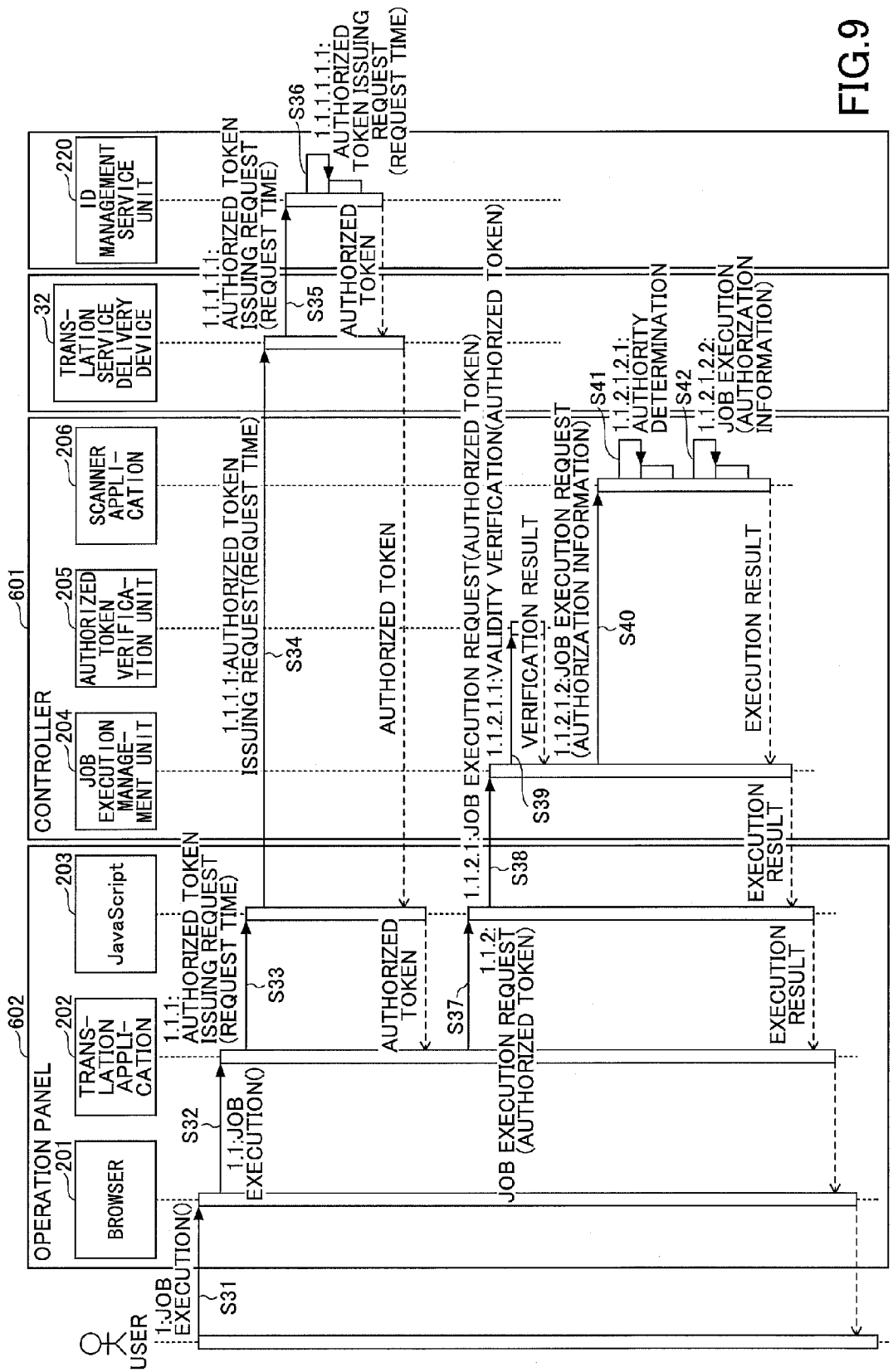
FIG. 9 is a sequence diagram of an example illustrating details of a process of the image forming apparatus when performing a job.

FIG. 9 is a sequence diagram of an example illustrating details of a process of the image forming apparatus when executing a job. In step S31, a user operating the operation panel 602 of the image forming apparatus 12 requests a job utilizing the translation application 202 by operating the browser 201. In step S32, the browser 201 requests the translation application 202 to execute the job.

In step S33, the translation application 202 requests the JavaScript 203 to issue an authorized token by specifying request time and an authentication ticket. In FIG. 9, a depiction of the authentication ticket is omitted. The request time specified at this time is utilized to set an expiration date of the authorized token in the ID management service unit 220.

In step S34, the JavaScript 203 requests the translation service delivery device 32 to obtain the authorized token by specifying the request time and the authentication ticket. In step S35, the translation service delivery device 32 requests the ID management service unit 220 to obtain the authorized token by specifying the request time and the authentication ticket specified by the JavaScript 203, and an application ID and an application password of the translation service.

In step S36, the ID management service unit 220 issues the authorized token by utilizing the specified request time and the authentication ticket and the application ID and the application password of the translation service.

For example, the ID management service unit 220 sets the time after a predetermined period of time (e.g., one hour later) from the specified request time for an expiration date of the authorized token, into the authorized token. Here, the request time of the service platform delivery system 40 is not used to set the expiration date but the request time specified by the image forming apparatus 12 is used to set the expiration date because the time may not be synchronized with each other and the image forming apparatus 12 checks the expiration date, not the platform delivery service 40. Accordingly, when the time is synchronized with each other, the ID management service unit 220 may set the expiration date of the authorized token by utilizing the request time of the service platform delivery system 40.

The ID management service unit 220 notifies the translation application 202 and the JavaScript 203 in the operation panel 602 of the issued authorized token by way of the translation service delivery device 32. In step S37, the translation application 202 requests the JavaScript 203 to execute the job by specifying the authorized token. In step S38, the JavaScript 203 requests the job execution management unit 204 of the controller 601 to execute the job by specifying the authorized token.

In step S39, the job execution management unit 204 requests the authorized token verification unit 205 to verify validity of the authorized token by specifying the notified authorized token. The authorized token verification unit 205 verifies the validity of the authorized token, and returns a result of the validity verification to the job execution management unit 204. Here, the validity verification of the authorized token performed by the authorized token verification unit 205 may include a check of whether the authorized token has been issued from the ID management service unit 220 in addition to a check of the expiration date.

The check of whether the authorized token has been issued may be performed, for example, in a manner such that the image forming apparatus 12 and the ID management service unit 220 have a common key and the image forming apparatus 12 decrypts the contents encrypted by the ID management service unit 220. When the image forming apparatus 12 can decrypt the contents encrypted by the ID management service unit 220, the authorized token is guaranteed to be issued from the ID management service unit 220. Here, the check of whether the authorized token has been issued from the ID management service unit 220 may be performed by utilizing an electronic signature or a public key.

In step S40, the job execution management unit 204 requests the scanner application 206 to execute the job by specifying authorization information. Here, the authorization information is information contained by the authorized token and to determine whether to have an authority to utilize a function of the image forming apparatus 12.

In step S41, the scanner application 206 determines whether to have the authority to utilize the function of the image forming apparatus 12 based on the authorization information. Details of a process in step S41 is described later.

Upon determining that the scanner application 206 has the authority to utilize the function of the image forming apparatus 12, the scanner application 206 executes the job in step S42. The scanner application 206 returns the execution result of the job to the job execution management unit 204. The job execution management unit 204 returns an execution result of the job to the translation application 202 and the JavaScript 203, and reflects the execution result of the job on the screen displayed by the browser 201.

<<Details of Process of Translation Service Delivery Apparatus and ID Management Service Unit in Issuing Authorized Token>>

Figure 10:
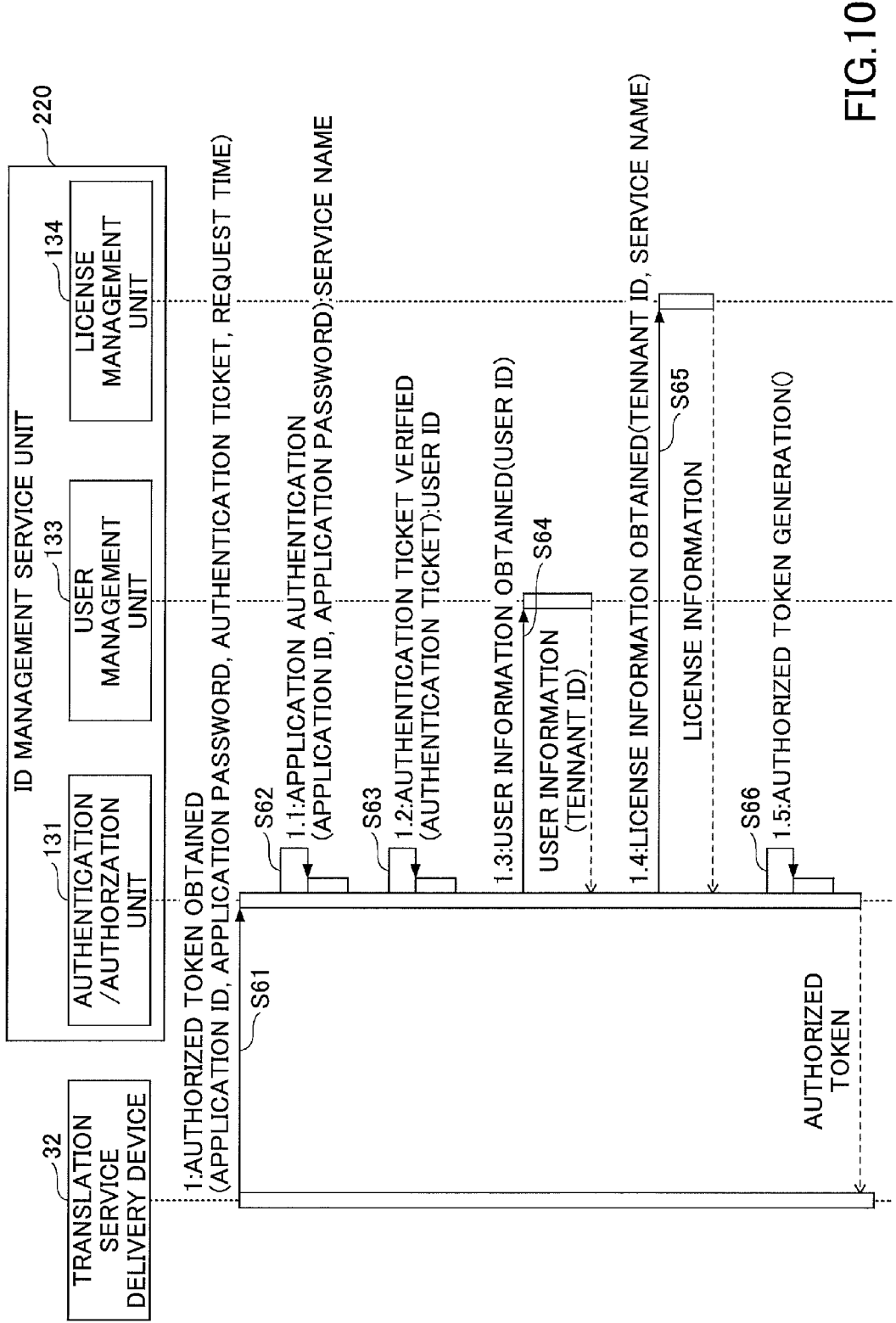
FIG. 10 is a sequence diagram of an example illustrating details of a process of a translation service delivery device and an ID management service unit when issuing an authorized token.

FIG. 10 is a sequence diagram of an example illustrating details of a process of the translation service delivery device 32 and the ID management service unit 220 when issuing an authorized token. In step S61, the translation service delivery device 32 requests the ID management service unit 220 to obtain an authorized token by specifying the request time and the authentication ticket specified by the image forming apparatus 12, and the application ID and the application password of the translation service.

FIG. 11 is an explanation drawing illustrating an example of contents included in an authorized token acquisition request. The authorized token acquisition request illustrated in FIG. 11 includes an application ID, and application password, an authentication ticket, and requested time.

In step S62, the authentication/authorization unit 131 of the ID management service unit 220 performs application authentication by using the application IF and the application password, and obtains a service name after normally finishing the application authentication. The application authentication in step S62 is a process for limiting the application that can utilize the authorized token acquisition application API in step S61. In step S63, the authentication/authorization unit 131 verifies the authentication ticket, and obtains a user ID after normally finishing the verification of the authentication ticket.

In step S64, the authentication/authorization unit 131 makes a user information acquisition request to the user management unit 133 by specifying the user ID obtained in step S63. The user management unit 133 specifies a tenant ID corresponding to the specified user ID from the user information stored in the user information storage unit 153. The user management unit 133 notifies the authentication/authorization unit 131 of the specified tenant ID.

In step S65, the authentication/authorization unit 131 makes a license information acquisition request to the license management unit 134 by specifying the tenant ID and the service name. The license management unit 134 specifies license information corresponding to the specified tenant ID and the service name from the license information stored in the license information storage unit 154. The license management unit 134 notifies the authentication/authorization unit 131 of the specified license information.

In step S66, the authentication/authorization unit 131 issues an authorized token described later by using the obtained service name and the license information. The authentication/authorization unit 131 returns the issued authorized token to the translation service delivery device 32.

Here, in the sequence diagram of FIG. 10, the authorized token issued by the authorized token acquisition API in step S61 is only an authorized token related to the translation service provided from the translation application, and cannot obtain an authorized token related to another service.

Moreover, in the sequence diagram of FIG. 10, a user who can use the authorized token acquisition API in step S61 is limited by specifying the tenant ID from the authentication ticket and then specifying the license information from the tenant ID and the service name. Furthermore, the authentication/authorization unit 131 checks whether there is a valid license of the translation service in a tenant to which the user belongs based on the obtained license information, and performs a process of returning the authorized token thereto when the valid license is present.

Figure 12:
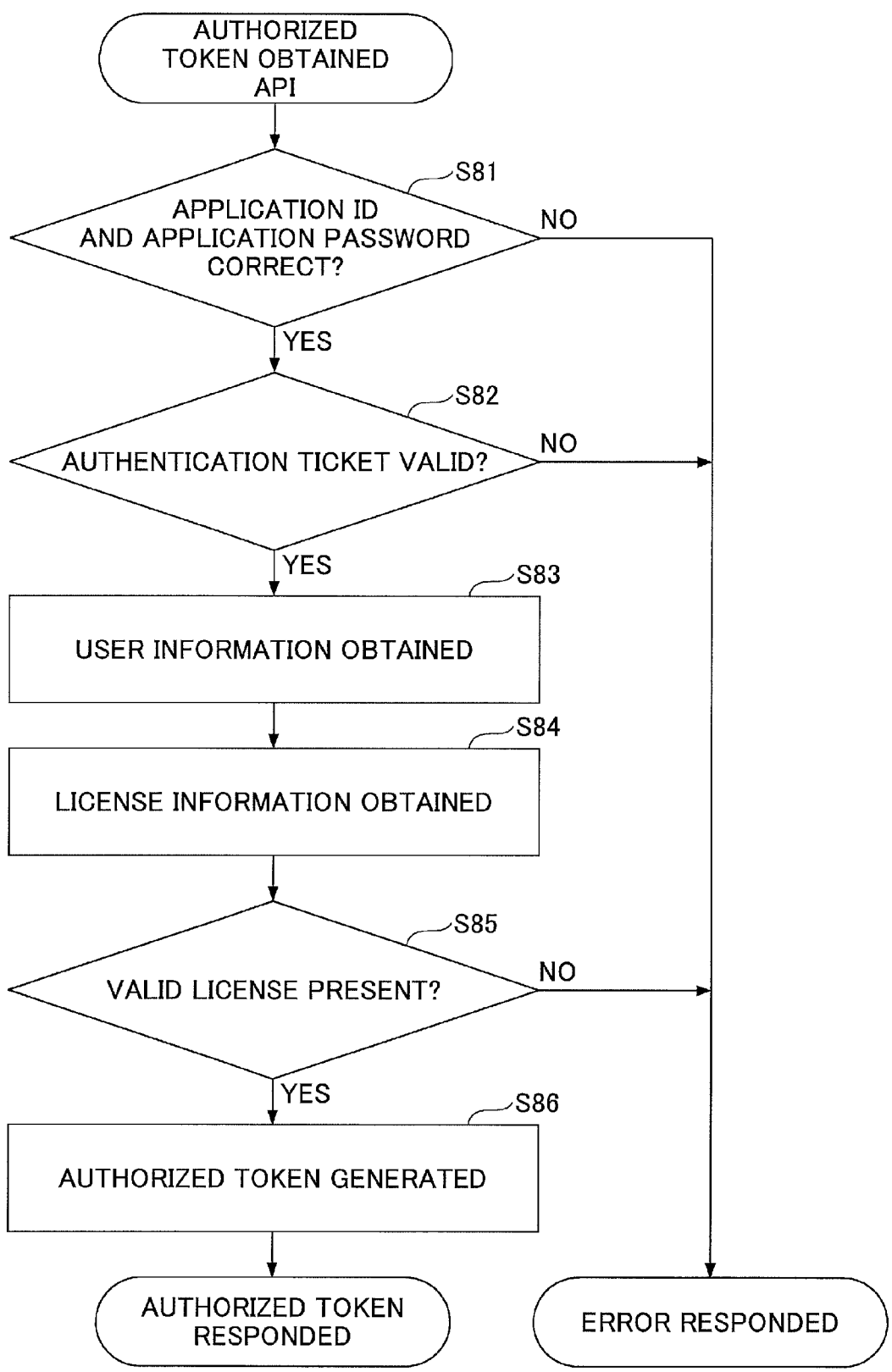
FIG. 12 is a flowchart illustrating an example of a process of authentication/authorization unit when issuing the authorized token.

FIG. 12 is a flowchart illustrating an example of a process of the authentication/authorization unit when issuing an authorized token. In step S81, the authentication/authorization unit 131 performs the application authentication by using the application ID and the application password, and determines whether the application ID and the application password are right in step S82.

When the application ID and the application password are right, the authentication/authorization unit 131 verifies the authentication ticket, and determines whether the authentication ticket is valid. When the authentication ticket is valid, the authentication/authorization unit 131 obtains user information (tenant ID) in step S83, and obtains license information in step S84.

In step S85, the authentication/authorization unit 131 determines whether to have a license valid to the obtained license. When a valid license is present, the authentication/authorization unit 131 generates an authorized token in step S86, and returns the authorized token thereto. In contrast, the authentication/authorization unit 131 returns an error when the application ID and the application password are not right; the authentication ticket is not valid in step S82; and there is no license valid to the obtained license in step S85.

<<Authorized Token>>

As discussed above, the authorized token according to the embodiment can be configured in a variety of forms. In step S41, the scanner application 206 determines whether to have an authority to utilize a function of the image forming apparatus 12 by different processes depending on the configuration of the authorized token. A description is given below of a process of determining whether to have an authority to utilize a function of the image forming apparatus 12 depending on a configuration of the authorized token while illustrating the configuration of the authorized token.

FIG. 13 is a configuration diagram illustrating an example of the authorized token. The token illustrated in FIG. 13 includes authorization information and information obtained by encrypting the authorization information. The authorization information includes an identifier, request time, an expiration data, a service name, and a contract category. The contract category is information indicating whether a license is a trial or an effective contract. As discussed above, the information obtained by encrypting the authorization information is used for checking that the authorized token was issued from the ID management service unit 220.

Figure 14:
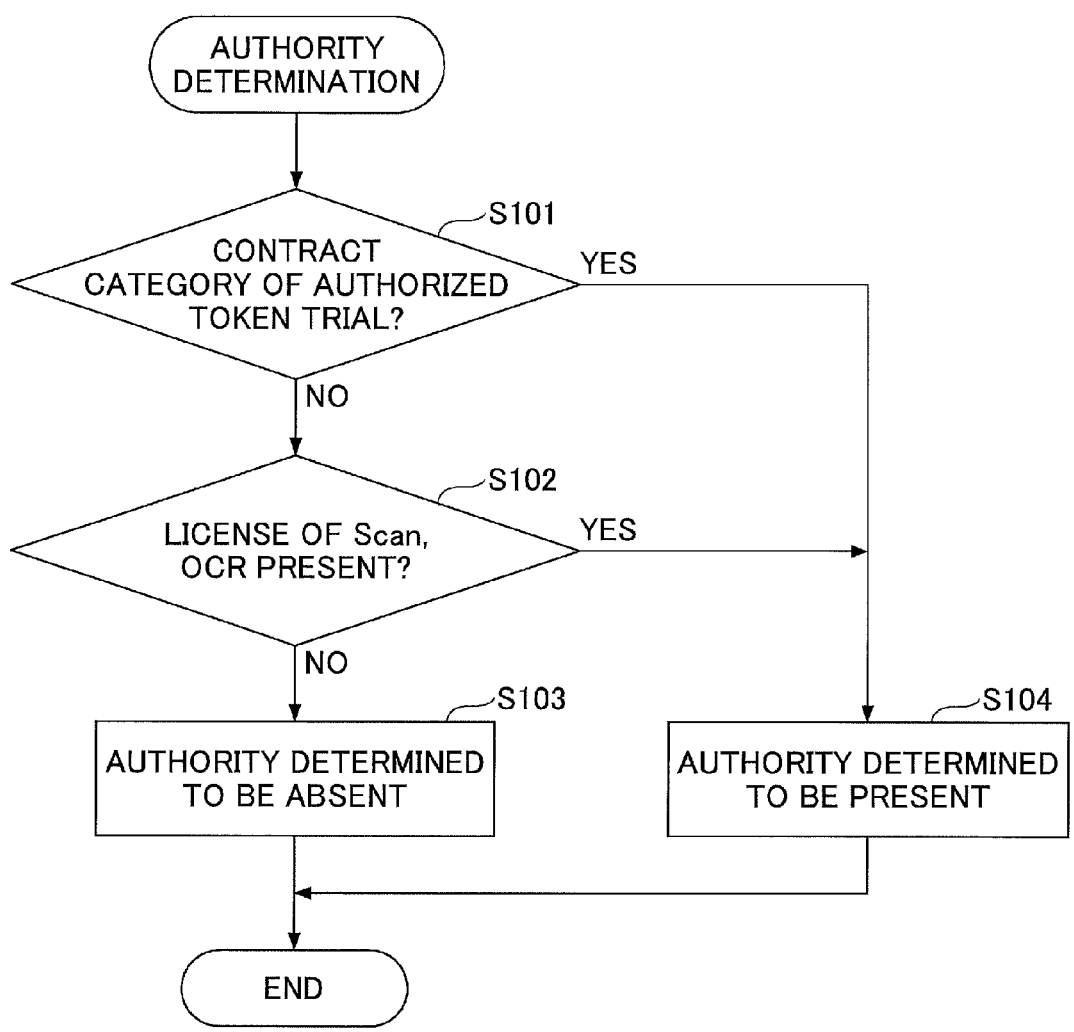
FIG. 14 is a flowchart illustrating an example of a determination process of determining whether to have an authority to utilize a function of the image forming apparatus.

In the authorized token configured as illustrated in FIG. 13, for example, the process in step S41 is performed as illustrated in FIG. 14. FIG. 14 is a flowchart illustrating an example of a process of determining whether to have an authority to utilize a function of the image forming apparatus 12.

In step S101, the scanner application 206 determines whether or not the contract category is the trial. When the contract category is the trial, in step S104, the scanner application 206 determines that there is an authority to use the scanner application 206 and the OCR application 207 without respect to presence or absence of a license of the scanner application 206 and the OCR application 207. In other words, when the contract category is the trial, the scanner application 206 determines that the authority to use the scanner application 206 and the OCR application 207 is present even when the license of the scanner application 206 and the OCR application is absent.

When the contract category is not the trial but the effective contract, in step S102, the scanner application 206 determines whether to have the license of the scanner application 206 and the OCR application 207. When the license of the scanner application 206 and the OCR application 207 is present, in step S104, the scanner application 206 determines that the authority to use the scanner application 206 and the OCR application 207 is present.

When the license of the scanner application 206 and the OCR application 207 is absent, in step S103, the scanner application 206 determines that the authority to use the scanner application 206 and the OCR application 207 is absent.

According to the process in the flowchart illustrated in FIG. 14, when the contract category of the translation service is the trial, the image forming apparatus 12 authorizes the use of the scanner application 206 and the OCR application 207 without the license of the scanner application 206 and the OCR application 207. Moreover, when the contract category is the effective contract, the image forming apparatus 12 determines whether to authorize the use of the scanner application 206 and the OCR application 207 depending on whether or not to have the license of the scanner application 206 and the OCR application 207.

For example, when the contract category of the translation service is the effective contract, the image forming apparatus 12 does not permit the use of the scanner application 206 and the OCR application 207 without the license of the scanner application 206 and the OCR application 207. Accordingly, a user needs to separately purchase the license of the scanner application 206 and the OCR application 207 when the contract category of the translation service is the effective contract. Here, the image forming apparatus 12 does not permit the use of the translation service when a license agreement of the translation service is not made or expired.

As stated above, the image forming apparatus 12 can operate differently from the contents of the license of the functions (scanner application 206, OCR application 207) of the image forming apparatus 12 based on the contents (contract category) of the authorized token issued from the ID management service unit 220.

In other words, a provider that provides the translation service can change the operation of the application installed in the image forming apparatus 12 based on the contents of the authorized token issued by the ID management service unit 220.

FIG. 15 is a configuration diagram of another example of the authorized token. The authorized token illustrated in FIG. 15 includes authorization information and information obtained by encrypting the authorization information. The authorization information includes an identifier of the authorization information, request time, an expiration date, and an available function name. The available function name shows a function name available for the image forming apparatus 12.

The scanner application 206 refers to the available function name of the authorized token in FIG. 15, and determines that there is an authority to use the scanner application 206 and the OCR application 207 when the scanner application 206 and the OCR application 207 are set to be the available function. Moreover, when the scanner application 206 and the OCR application 207 are not set to be the available function in the authorized token, the scanner application 206 separately determines whether to have a license of the scanner application 206 and the OCR application 207.

For example, the image forming apparatus 12 does not permit the use of the scanner application 206 and the OCR application 207 when the license of the scanner application 206 and the OCR application 207 is absent. The image forming apparatus 12 permits the use of the scanner application 206 and the OCR application 207 when the license of the scanner application 206 and the OCR application 207 is present.

The available function name of the authorized token in FIG. 15 is, for example, set as illustrated in the following. FIG. 16 is a configuration diagram illustrating an example of a service license/function correspondence table utilized by the ID management service unit for generating an authorized token. In the service license/function correspondence table of FIG. 16, for example, a contract category and a function name are associated with each service name of the translation service.

The contract category is similar to the contract category in FIG. 13. Furthermore, the function name is similar to the available function name in FIG. 15. The ID management service unit 220 can specify a function available for the image forming apparatus 12 set to be associated with the service name and the contract category by utilizing the service license/function correspondence table of FIG. 16.

For example, when the contract category of the translation service is the trial in the service license/function correspondence table of FIG. 16, the scanner application 206, the OCR application 207 and a monochrome print application are set to be the available function name of the authorized token. In the trial in the service license/function correspondence table of FIG. 16, when the contract category of the translation service is the effective contract (paid), the scanner application 206, the OCR application 207 and the monochrome print application and a color print application are set to be the available function name of the authorized token.

Thus, when the contract category of the translation service is the effective contract (paid), the scanner application 206 of the image forming apparatus 12 separately needs to determine whether to have a license of the OCR application 207. Here, to create the service license/function correspondence table illustrated in FIG. 16, an operator of the service platform delivery service 40 may request a provider who provides a service such as the translation service to submit an application as illustrated in FIG. 17.

FIG. 17 us a schematic diagram illustrating an example of the application. The application in FIG. 17 is to apply an available function for each contract category. The operator of the service platform delivery system 40 creates the service license/function correspondence table setting the function name (available function name) for each contract category of the service name of "translate" as illustrated in FIG. 16 in response to the application as illustrated in FIG. 17.

According to the authorized token illustrated in FIG. 15, when the contract category of the translation service is the trail, the image forming apparatus 12 permits the use of the scanner application 206 and the OCR application 207 even if the license of the scanner application 206 and the OCR application 207 is absent. Moreover, when the contract category of the translation service is the effective contract, the image forming apparatus 12 determines whether to permit the use of the OCR application depending on whether to have the license of the OCR application.

For example, when the contract category of the translation service is the effective contract, the image forming apparatus 12 does not permit the use of the OCR application 207 without the license of the OCR application 207. The user needs to separately purchase the license of the OCR application when the translation category of the translation service is the effective contract.

As discussed above, the image forming apparatus 12 can operate differently from the contents of the license of the functions (scanner application 206, OCR application 207) of the image forming apparatus 12 based on the contents (available function name) of the authorized token issued from the ID management service unit 220.

In other words, a provider that provides the translation service can change the operation of the application installed in the image forming apparatus 12 based on the contents of the authorized token issued by the ID management service unit 220.

FIG. 18 is a configuration diagram illustrating another example of the authorized token. The authorized token illustrated in FIG. 18 differs from the authorized token in FIG. 15 in that the available name in FIG. 15 is replaced by a role name. The role name shows a type of a user such as a tenant administrator, a general user or the like. The scanner application 206 sets a function available for the type of user shown by the role name by associating the function with the role name.

The scanner application 206 refers to the role name of the authorized token in FIG. 15, and determines that there is an authority to use the scanner application 206 and the OCR application 207 when the scanner application 206 and the OCR application 207 are set to be the function available for the type of user shown by the role name. Moreover, when the scanner application 206 and the OCR application 207 are not set to be the function available for the type of user shown by the role name in the authorized token, the scanner application 206 separately determines whether to have a license of the scanner application 206 and the OCR application 207.

For example, the image forming apparatus 12 does not permit the use of the scanner application 206 and the OCR application 207 when the license of the scanner application 206 and the OCR application 207 is absent. The image forming apparatus 12 permits the use of the scanner application 206 and the OCR application 207 when the license of the scanner application 206 and the OCR application 207 is present.

According to the authorized token illustrated in FIG. 18, when the role name indicates, for example, a tenant administrator, the image forming apparatus 12 permits the use of the scanner application 206 and the OCR application 207 even if the license of the scanner application 206 and the OCR application 207 is absent. Moreover, when the role name indicates, for example, a general user, the image forming apparatus 12 determines whether to permit the use of the scanner application 206 and the OCR application depending on whether to have the license of the scanner application 206 and the OCR application 207.

For example, when the role name indicates the general user, the image forming apparatus 12 does not permit the use of the scanner application 206 and the OCR application 207 without the license of the scanner application 206 and the OCR application 207. The user needs to separately purchase the license of the scanner application 206 and the OCR application when the role name is the general user.

As discussed above, the image forming apparatus 12 can operate differently from the contents of the license of the functions (scanner application 206, OCR application 207) of the image forming apparatus 12 based on the contents (role name) of the authorized token issued from the ID management service unit 220.

In other words, a provider that provides the translation service can change the operation of the application installed in the image forming apparatus 12 based on the contents of the authorized token issued by the ID management service par 220.

The information processing system 1 of the present embodiment can unify the management of the authority to utilize the service provided for the image forming apparatus 12 because the service platform delivery system 40 the authorized token as stated above.

<<Details of Another Example of Process of Image Forming Apparatus when Executing Job>>

Figure 19:
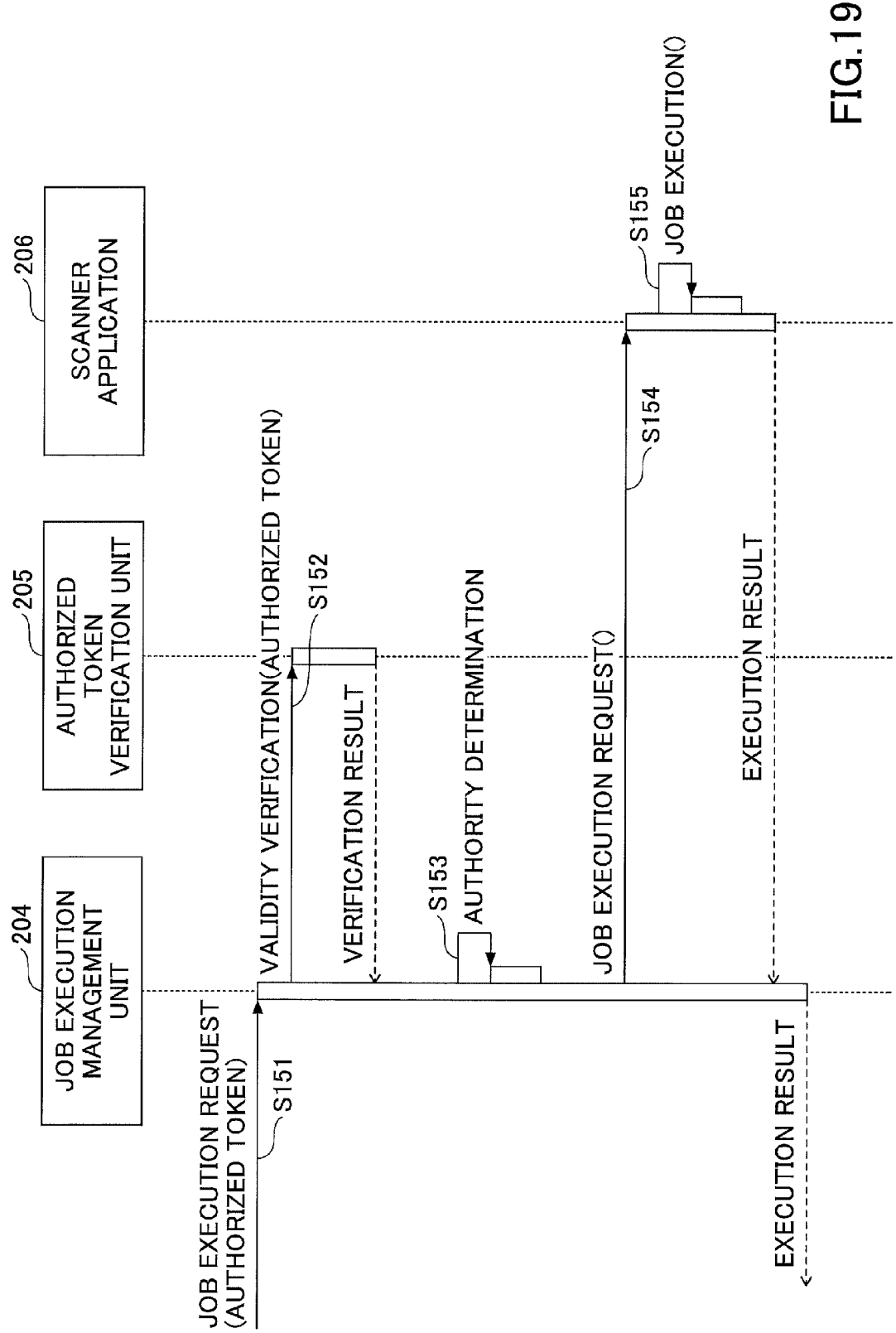
FIG. 19 is a sequence diagram of another example illustrating details of a process of the image forming apparatus when performing a job.

In the process of the sequence process illustrated in FIG. 9, the process of the controller in steps S38 through S42 may be performed, for example, as illustrated in FIG. 19. FIG. 19 is a sequence diagram of another example illustrating details of a process of the image forming apparatus when executing a job.

In step S51, the job execution management unit 204 is requested to execute a job in which an authorized token is specified from the JavaScript 203. In step S152, the job execution management unit 204 requests the authorized token verification unit 205 to verify validity of the authorized token by specifying the notified authorized token. The authorized token verification unit 205 verifies the validity of the authorized token as illustrated in step S39, and returns a result of the validity verification to the job execution management unit 204.

In step S153, the job execution management unit 204 confirms whether to have an authority to utilize the function of the image forming apparatus 12 needed to use the translation service by using a correspondence table between an API and a necessary function as illustrated in FIG. 20.

FIG. 20 is a diagram illustrating an example of a correspondence table between the API and the necessary function. In the correspondence table illustrated in FIG. 20, the necessary function of the image forming apparatus 12 is associated with each API showing a type of service. For example, in the correspondence table in FIG. 20, the scanner application and the OCR application are set to be the function of the image forming apparatus 12 necessary for the API of "scan+OCR."

The job execution management unit 204 determines whether to have the authority to utilize the function of the image forming apparatus 12 needed to use the translation service by the authorized token as described above. When the authority to utilize the function of the image forming apparatus 12 is present, the job execution management unit 204 requests the scanner application 206 to execute the job in step S154.

The scanner application 206 executes the job in step S155. The scanner application 206 returns an execution result of the job to the job execution to the job execution management unit. Moreover, the job execution management unit 204 returns the execution result of the job to the translation application and the JavaScript 203, and reflects the execution result on the screen displayed by the browser.

CONCLUSION

The information processing system 1 of the first embodiment can causes the electronic device such as the image forming apparatus 12 to operate differently from the licensed contents of the function of the electronic device based on the licensed contents of the service provided for the electronic device from the service delivery system 30. In other words, the information processing system 1 of the first embodiment can set an exception of the license management of the function of the electronic device.

As discussed above, according to the embodiments of the present invention, an electronic device can be caused to operate differently from licensed contents of a function of the electronic device based on licensed contents of a service provided for the electronic device from an information processing apparatus.

The present invention is not limited to the above specifically disclosed embodiments, but various changes, modifications or alternations can be made without departing from the claimed invention. For example, the translation service 32 is an example of the service delivery unit. The ID management service unit 220 is an example of the information management unit and the information management device.

The job execution management unit 204 is an example of the execution management unit. The scanner application 206 is an example of the execution unit. The translation application 202 and the JavaScript 203 are examples of the request unit. The authorized token is an example of the available permitted information. The functions of the scanner application 206 and the OCR application 207 are examples of the functions of the electronic device. The translation service is an example of the service provided from the information processing apparatus.

The present application is based on and claims the benefit of priority of Japanese Priority Patent Application No. 2014-221762, filed on Oct. 30, 2014, the entire contents of which are incorporated herein by reference.

What is claimed is:

1. An information processing system including at least one information processing device and an electronic device configured to utilize a service provided from the at least one information processing device, comprising:
    a service delivery device configured to provide the service for the electronic device, the service utilizing a function of the electronic device as a part of the service to implement the service; and
    an information management device, in response to a request from the electronic device that has a license to implement the service, configured to manage license information of the service, to generate use permission information including contents of the license and to send the generated use permission information to the electronic device,
    wherein the electronic device comprises a hardware processor that executes a program so as to implement:
    an execution management unit configured to manage an execution request of the service specifying the use permission information of the service; and
    an execution unit configured to determine whether to have a use authority of the function of the electronic device utilized by the service based on the contents of the license included in the use permission information of the service and configured to execute the service by utilizing the function of the electronic device upon determining that the use authority of the function of the electronic device utilized by the service is present,
    wherein the execution unit is configured to determine whether to have the use authority of the function of the electronic device utilized by the service based on contents of a second license of the function of the electronic device set for the electronic device upon determining that the use authority of the function of the electronic device utilized by the service is absent based on the contents of the license included in the use permission information of the service.

2. The information processing system of claim 1, wherein the execution unit is configured to execute the service by utilizing the function of the electronic device without respect to contents of a second license of the function of the electronic device set for the electronic device upon determining that the use authority of the function of the electronic device utilized by the service is present based on the contents of the license included in the use permission information of the service.

3. The information processing system of claim 1,
    wherein the contents of the license included in the use permission information of the service is contract category information indicating a trial or an effective contract, and
    the execution unit is configured to determine that the use authority of the function of the electronic device utilized by the service is present when the contract category information is the trial, and to determine whether to have the use authority of the function of the electronic device utilized by the service based on the contents of the license of the function of the electronic device set for the electronic device.

4. The information processing system of claim 1,
wherein the contents of the license included in the use permission information of the service is available function information set for each piece of contract category information indicating a trial or an effective contract, and
the execution unit is configured to determine whether to have the use authority of the function of the electronic device utilized by the service based on the available function information set for each piece of the contract category information.

5. The information processing system of claim 1,
wherein the contents of the license included in the use permission information of the service is role information indicating a type of a user, and
the execution unit is configured to determine whether to have the use authority of the function of the electronic device utilized by the service based on the role information included in the use permission information of the service.

6. The information processing system of claim 1, wherein the execution management unit is configured to determine whether to have the use authority of the function of the electronic device utilized by the service based on the contents of the license included in the use permission information of the service, and requests the execution unit to execute the service upon determining that the use authority of the function of the electronic device utilized by the service is present.

7. An electronic device configured to utilize a service provided from at least one information processing apparatus, the electronic device comprising a hardware processor that executes a program so as to implement:
  a request unit configured to manage license information of a service provided from a service delivery device and to request use permission information of the service from an information management device configured to generate and send the use permission information, the service utilizing a function of the electronic device as a part of the service to implement the service, the electronic device having a license to implement the service;
  an execution management unit configured to manage an execution request of the service specifying the use permission information of the service; and
  an execution unit configured to determine whether to have a use authority of the function of the electronic device utilized by the service based on contents of the license included in the use permission information of the service and configured to execute the service by utilizing the function of the electronic device upon determining that the use authority of the function of the electronic device utilized by the service is present,
wherein the execution unit is configured to determine whether to have the use authority of the function of the electronic device utilized by the service based on contents of a second license of the function of the electronic device set for the electronic device upon determining that the use authority of the function of the electronic device utilized by the service is absent based on the contents of the license included in the use permission information of the service.

8. A service authorization method executed by an information processing system including at least one information processing device and an electronic device configured to utilize a service provided from the at least one information processing device, the method comprising steps of:
  generating use permission information based on a request from the electronic device configured to manage license information of the service provided from the information processing device based on a request from the electronic device having a license of the service, the service utilizing a function of the electronic device as a part of the service to implement the service, the use permission information including contents of the license;
  sending the generated use permission information of the service to the electronic device;
  managing the execution request of the service specifying the use permission information of the service in the electronic device;
  determining whether to have a use authority of the function of the electronic device utilized by the service based on the contents of the license included in the use permission information;
  executing the service upon determining that the use authority of the function of the electronic device utilized by the service is present; and
  determining whether to have the use authority of the function of the electronic device utilized by the service based on contents of a second license of the function of the electronic device set for the electronic device upon determining that the use authority of the function of the electronic device utilized by the service is absent based on the contents of the license included in the use permission information of the service.

* * * * *